United States Patent [19]

Williams

[11] 3,911,283
[45] Oct. 7, 1975

[54] PERSONNEL IONIZING RADIATION DOSIMETER
[75] Inventor: Robert A. Williams, Vandergrift, Pa.
[73] Assignee: Atlantic Richfield Company, Los Angeles, Calif.
[22] Filed: Feb. 8, 1974
[21] Appl. No.: 440,893

[52] U.S. Cl. ................. 250/483; 250/390; 250/484
[51] Int. Cl. ............................................... G01t 1/02
[58] Field of Search ............ 250/484, 483, 390, 392

[56] References Cited
UNITED STATES PATENTS

| | | | |
|---|---|---|---|
| 3,562,480 | 2/1971 | Korba | 250/484 |
| 3,699,337 | 10/1972 | Hoy | 250/483 |
| 3,761,710 | 9/1973 | Yamashita et al. | 250/484 |
| 3,792,280 | 2/1974 | Piltingsrud | 250/484 |

Primary Examiner—Harold A. Dixon
Attorney, Agent, or Firm—Coleman R. Reap

[57] ABSTRACT

A dosimeter and method for use by personnel working in an area of mixed ionizing radiation fields for measuring and/or determining the effective energy of X- and gamma radiation; beta, X-, and gamma radiation dose equivalent to the surface of the body; beta, X-, and gamma radiation dose equivalent at a depth in the body; the presence of slow neutron, fast neutron dose equivalent; and orientation of the person wearing the dosimeter to the source of radiation is disclosed. Optionally integrated into this device and method are improved means for determining neutron energy spectrum and absorbed dose from fission gamma and neutron radiation resulting from accidental criticality.

22 Claims, 9 Drawing Figures

U.S. Patent  Oct. 7,1975  Sheet 1 of 2  3,911,283
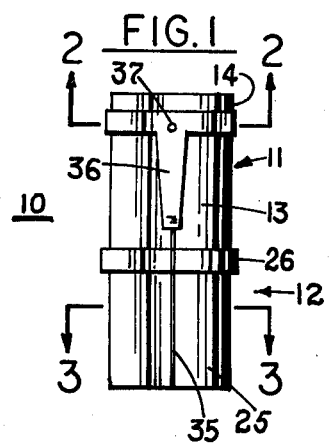
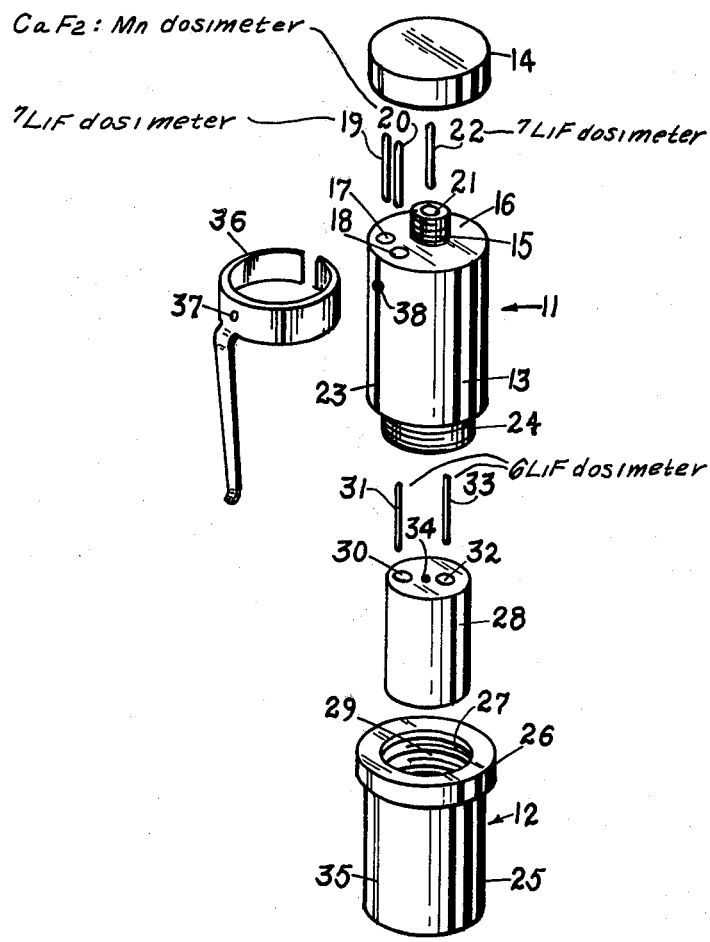
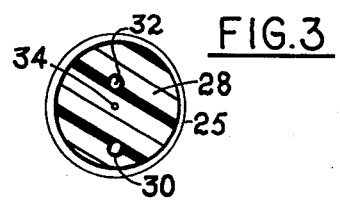
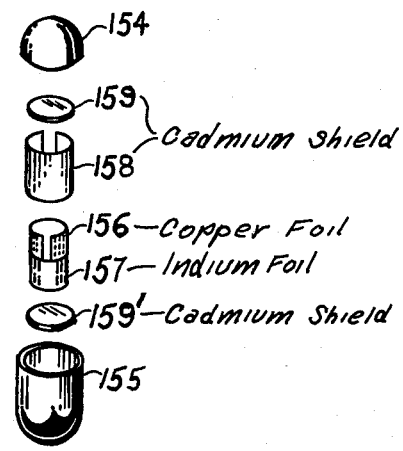
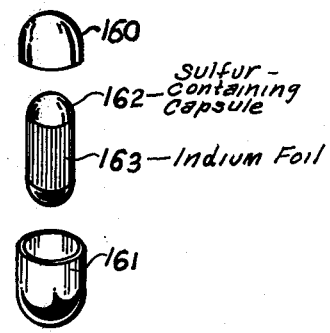

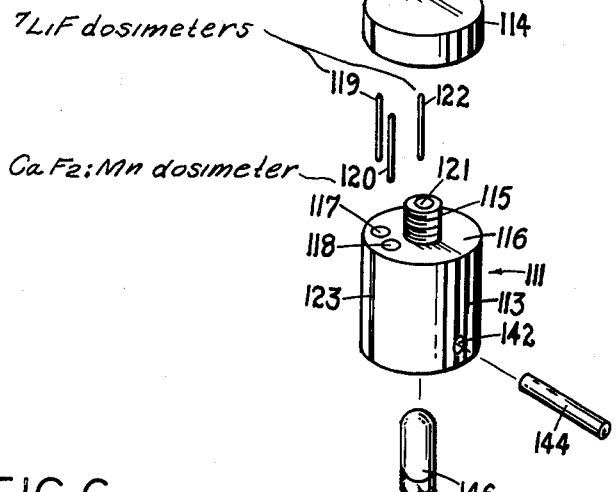
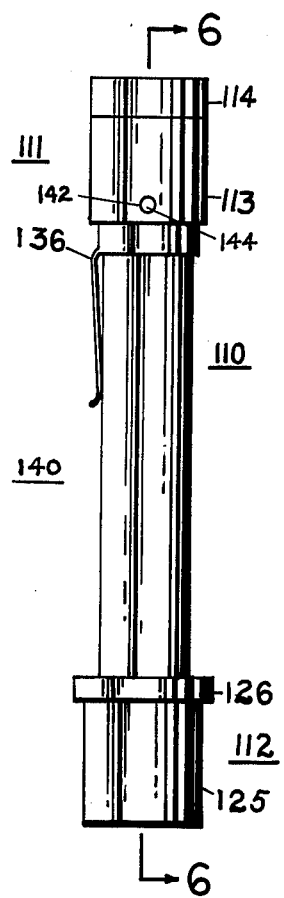
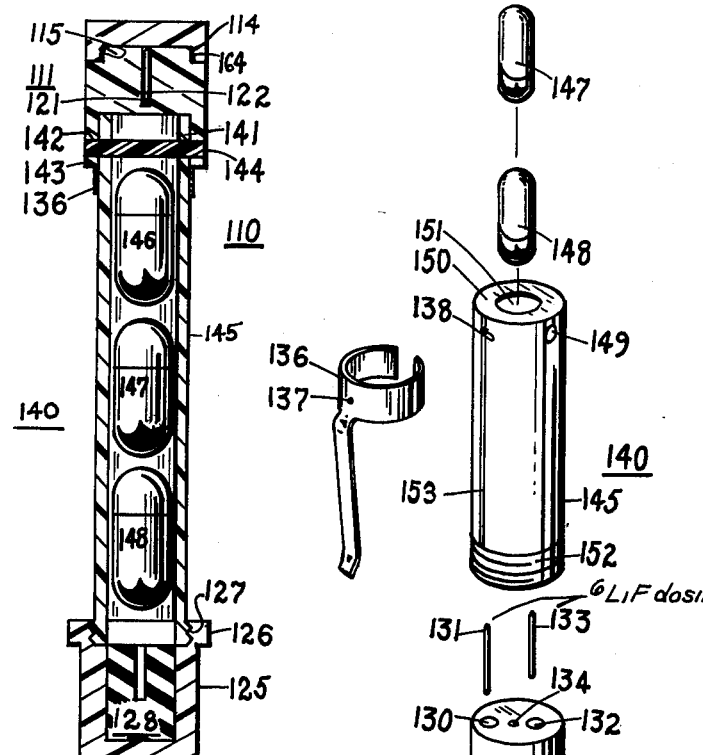
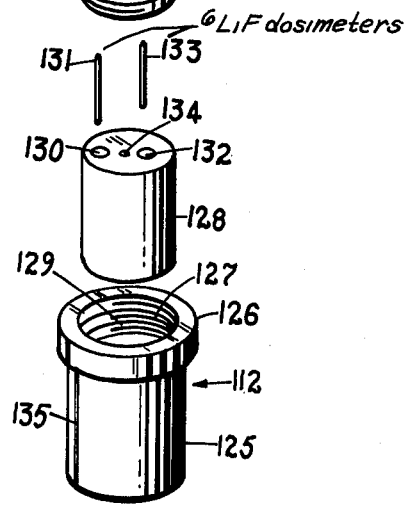

PERSONNEL IONIZING RADIATION DOSIMETER

BACKGROUND OF THE INVENTION

1. Field of the Invention

This invention relates to ionizing radiation dosimetry and more particularly to a novel routine personnel and accidental criticality dosimeter and a method for determining all relevant dosimetry information from a single dosimeter.

2. Description of the Prior Art

The use of thermoluminiscent materials for the detection and measurement of ionizing radiation has progressed very rapidly over the last 20 years. In fact, thermoluminiscent dosimetry (TLD) is now considered more desirable than ionization chamber and film badge dosimetry since it is much versatile in that it provides a quick and easy method of accurately measuring the intensity and energy of beta, gamma, and neutron radiation to which a person wearing such a dosimeter is exposed. The state of the art in this new field is described in the book THERMOLUMINISCENT DOSIMETRY by Cameron, Suntharalingam, and Kenney, University of Wisconsin Press, 1968. The use of lithium fluoride and calcium fluoride thermoluminiscent dosimeters for measuring radiation is described on pages 14–19 and 37–52 of this book. Preston, THE MEASUREMENT OF PERSONNEL NEUTRON DOSE IN THE ENERGY REGION 0.5V to 10 MeV WITH THERMOLUMINISCENT LITHIUM FLUORIDE, published by the United Kingdom Atomic Energy Authority as Bulletin No. AEEW-M801, 1968 describes the use of $^6$LIF and $^7$LIF in combination to determine the amount of incident and reflected thermal neutron fluence in a field of mixed gamma and neutron radiation. The report SAVANNAH RIVER PLANT CRITICALITY DOSIMETRY SYSTEM, by Wright, Hoy, and Splichal, Jr. (DP-1006, Rev 1, Nov. 1965) describes a criticality dosimeter which provides information for determining the neutron fluence in several energy bands ranging from thermal neutrons up to those having energies above 2.5 MeV. This dosimeter also provides information for determining the gamma dose and the orientation of the person wearing the dosimeter to source of radiation. Although the above disclosures represent advances in the field of thermoluminiscent dosimetry, they do not provide the information required for a rapid determination of the quality and intensity of radiation received by the body. For instance, they do not provide accurate and rapid, wide range, neutron dose estimation in the event of exposure to an accidental criticality, e.g., they cannot assess neutron dose less than about 25000 millirad; or a comparison of surface and depth gamma, beta, and neutron personnel dose. Secondly, they do not provide gamma spectrum information. Thirdly, they do not provide a method of quickly and easily determining the orientation of the person wearing the dosimeter to an intense source of radiation, i.e., without analyzing the blood of the person. Fourthly, the containment components of the Savannah River Criticality dosimeter are plastic and present the disadvantage that they must be handled after an accidental criticality in order to remove the sulfur and sodium fluoride contained therein for chemical analysis.

SUMMARY OF THE INVENTION

A dosimeter has now been invented which is free of the above-noted and other disadvantages of prior art dosimeters. This dosimeter provides information which makes possible the rapid and accurate determination of surface and depth beta, gamma, and neutron dose; the presence of slow neutrons; gamma and neutron energy spectrum information; and information relating to the orientation of the body of the person exposed to radiation to the source of radiation. The dosimeter of the invention can assess neutron dose as low as 1 millirad irrespective of source and can assess gamma dose from millirads to megarads. Thus, the dosimeter of the invention can be used to measure essentially any range of radiation encountered by a worker in the field.

Accordingly, it is an object of the invention to present a dosimeter which provides information for rapidly determining X-ray and gamma energy spectrum information.

It is another object of the invention to present a dosimeter which provides information for determining the beta, X-, and gamma radiation dose equivalent at the surface of the body of a person wearing the dosimeter.

It is another object of the invention to present a dosimeter for determining beta, X-, and gamma dose equivalent at a given depth in the body of a person wearing the dosimeter.

It is another object of the invention to present a pocket dosimeter capable of measuring the dose equivalent of radiation to the bones of the wearer.

It is another object of the invention to present a dosimeter for detecting the presence of slow neutrons in a field of radiation.

It is another object of the invention to present a dosimeter for determining the fast neutron dose equivalent to the body of a person wearing the dosimeter.

It is another object of the invention to present a dosimeter for rapidly determining the orientation of the body of a person wearing the dosimeter in a field of intense ionizing radiation to the source of radiation without the necessity of analyzing the sodium in the person's blood.

It is another object of the invention to present a dosimeter for determining the absorbed dose to the body of a person from fission gamma and neutron radiation resulting from an accidental criticality.

It is another object of the invention to present a single integrated dosimeter capable of providing all necessary personnel and accidental criticality ionizing radiation information.

It is another object to present an improved method for detecting or determining effective energy of beta, X-, and gamma radiation; beta, X-, and gamma dose equivalent at the surface of the body; beta, X-, and gamma dose equivalent at a depth in the body; the presence of slow neutrons; fast neutron dose equivalent to the body; orientation of the body of a person in an intense field of ionizing radiation to the source of radiation; and all necessary personnel and accidental criticality information.

These and other objects of the invention will become apparent from the following description and drawings.

The objects of the invention are achieved by the dosimeter of the invention which comprises a pocket dosimeter containing a personnel dosimeter unit comprised of a first section of animal tissue-equivalent material which contains $^7$LiF and $CaF_2$:Mn dosimeter capsules near the front surface of the section and a second $^7$LiF dosimeter capsule located in the interior of the section and a second section of animal tissue-equivalent high hydrogen density material containing a first $^6$LiF dosimeter capsule near the front surface and a second $^6$LiF dosimeter capsule at a measured depth from the front surface of the section; and an optional accidental criticality dosimeter unit comprised of a first water-soluble capsule containing rolled sheets of indium and copper metal enveloped in cadmium shield, a second water-soluble capsule containing sodium fluoride, and a third water-soluble capsule containing a rolled sheet of indium and an inner water-soluble capsule containing sulfur powder.

DESCRIPTION OF THE INVENTION

In the drawings which illustrate specific embodiments of the invention:

FIG. 1 is a front elevational view of one embodiment of the invention showing a personnel dosimeter.

FIG. 2 is a transverse cross-sectional view taken on the plane 2—2 of FIG. 1.

FIG. 3 is a transverse cross-sectional view taken on the plane 3—3 of FIG. 1.

FIG. 4 is an exploded perspective view of the dosimeter of FIG. 1.

FIG. 5 is a front elevational view of another embodiment of the dosimeter of the invention showing a dosimeter containing a personnel dosimetry section and an accidental criticality dosimetry section.

FIG. 6 is a view partly in section taken on the plane 6—6 of FIG. 5 showing three dosimeter capsules in position.

FIG. 7 is an exploded perspective view of the dosimeter of FIG. 5.

FIG. 8 is an exploded view of a portion of the dosimeter of FIG. 5 showing a capsule containing cadmium shielding and strips of copper and indium foils.

FIG. 9 is an exploded view of another portion of the dosimeter of FIG. 5 capsule showing a capsule containing a strip of indium foil wrapped around a smaller capsule containing sulfur.

Referring first to the embodiment illustrated in FIGS. 1–4, dosimeter 10 is comprised of an upper cylinder 11 and a lower cylinder 12. Upper and lower cylinders 11 and 12 are constructed from tissue-equivalent material, i.e., material having density and radiation absorption characteristics similar to animal tissue and which attenuates beta and gamma radiation. Materials found to be suitable for this purpose include high molecular weight polymers. Polytetrafluoroethylene and polyvinylchloride are particularly suitable because they possess good structural properties and have an atomic electron structure similar to human tissue for beta and gamma radiation attenuation purposes.

Upper cylinder 11 is of solid construction and is comprised of a body 13 and a cap 14. Body 13 is provided on its upper end with a threaded projection 15. Cap 14 is provided with a threaded recess (see FIG. 6, reference numeral 164) which engages with threaded projection 15 to fixedly attach cap 14 to body 13. Top face 16 of body 13 is provided with wells 17 and 18 which have outer perimeters located approximately 1/32 inch from the front surface of body 13 and which are adapted to receive small capillary dosimeters 19 and 20 respectively. The outer edges of wells 17 and 18 are preferably about 1/64 inch apart. Threaded projection 15 is provided with a well 21 centrally located and adapted to receive a small capillary dosimeter 22. The front of well 21 is approximately 5/16 inch from the front surface of body 13. On the front face of body 13 and extending longitudinally from the top to the bottom of body 13 is etched a straight line 23. Located on the bottom of body 13 is a second threaded projection 24.

Lower cylinder 12 is comprised of a thin walled cylindrical shell 25 which is attached at its upper end to annular shoulder 26. Annular shoulder 26 has internal threads 27 which are adapted to engage with threaded projection 24. Lower cylinder 12 is hollow and is adapted to receive insert 28 through opening 29 in press-fit relationship. Insert 28 is made of a material which is a good moderator for fast neutrons. Exemplary of suitable materials are those which have a high hydrogen content. A very satisfactory material is high density polyethylene which not only has a very high hydrogen concentration but is also durable. Insert 28 is provided with a front well 30 adapted to receive capillary dosimeter 31 and a rear well 32 adapted to receive capillary dosimeter 33. Well 30 is so situated in insert 28 that the front surface of well 30 is about 1/32 inch from the outer front surface of shell 25 when the dosimeter is assembled. Well 32 is so located in insert 28 that the front wall of well 32 is about 3/8 inch from the outside front wall of shell 25. Insert 28 is provided with a small threaded hole 34 into which can be screwed a screw or other threaded device for extracting insert 28 from cylinder 25. Etched into the front face of lower cylinder 12 and extending longitudinally from the top of shoulder 26 to the bottom of shell 25 is a straight line 35.

Capillary dosimeters 19, 20, 22, 31, and 33 are constructed of sturdy material of high transparency such as glass and are intended for repeated use. The walls of the capillaries are desirably very thin so that a minimum of the radiation passing through the walls of the dosimeters is absorbed. Each dosimeter contains a carefully measured amount of phosphor powder. Each of the capillary dosimeters has been carefully calibrated against a standard under actual test conditions and a correlation between the reading obtained and the intensity of radiation fluence is known. Capillary dosimeters 19 and 22 contain lithium fluoride having a high percentage of $^7$Li isotope. A suitable lithium fluoride sold under the trademark TLD-700 by Harshaw-Chemical Co. contains 99.99% $^7$Li isotope and 0.01% $^6$Li isotope. The phosphor in dosimeters 19 and 22 is hereinafter referred to as $^7$LiF. Capillary dosimeter 20 contains manganese activated calcium fluoride in a known ratio of manganese to calcium fluoride. A suitable calcium fluoride is sold under the trademark TLD-200 by Harshaw-Chemical Co. This phosphor is designated $CaF_2$:Mn for this discussion. Capillary dosimeters 31 and 33 contain lithium fluoride having a known high percentage of $^6$Li isotope. One suitable lithium fluoride sold under the trademark TLD-600 by Harshaw-Chemical Co. contains 95.6% $^6$Li isotope and 4.4% $^7$Li isotope. The phosphor in capillary dosimeters 31 and 33 is hereinafter referred to as $^6$LiF.

Personnel dosimeter 10 is prepared for use as follows: Insert 28 is carefully pressed into lower cylinder 12 with the insert oriented such that line 35 and the center of wells 30 and 32 all lie in the same vertical plane. Each of the capillary dosimeters is then placed in the proper well and cap 14 and lower cylinder 12 are screwed onto the upper cylinder body 13, care being taken to insure that lines 23 and 35 are in alignment.

When these lines are in alignment, each of the capillary dosimeters is in its proper position with respect to the front of the dosimeter.

Dosimeter 10 is preferably carried in the breast pocket of the wearer and for this purpose suitable means is provided for fastening the dosimeter to the pocket in the right position. In the embodiment shown in FIGS. 1–4, a stainless steel clip 36 is provided for this purpose. Clip 36 has an inward depression 37 which fits into corresponding depression 38 in body 13. When the clip is mounted on the dosimeter and depressions 37 and 38 engaged, the dosimeter will be oriented properly with respect to the body of the wearer when the dosimeter is clipped into the breast pocket of the wearer's clothing.

Referring now to the embodiment of the invention shown in FIGS. 5–9, dosimeter 110 is comprised of a personnel dosimeter contained in upper cylinder 111 and lower cylinder 112 and an accidental criticality dosimeter 140. The personnel dosimeter shown in FIGS. 5–9 is identical to the dosimeter shown in FIGS. 1–4 except for a slight modification of upper cylinder body 113 and, accordingly, the same reference numerals prefixed by the numeral 1 are used to designate the same or corresponding parts. Body 113 is provided with a hollow recess 141 (see FIG. 6) which extends longitudinally into body 113. A hole 142 extends transversely through the annular portion 143 of body 113 formed by recess 141. Hole 142 is adapted to receive pin 144.

Accidental criticality dosimeter 140 is comprised of a central cylinder 145 and capsules 146, 147, and 148. Cylinder 145 is provided with a hole 149 which extends transversely through cylinder 145 and which is approximately the same diameter as hole 142. Hole 149 is located at such a distance below the top 150 of central cylinder 145 that it can be aligned with hole 142 when central cylinder 145 is inserted into recess 141. Central cylinder 145 is provided with a well 151 which enters through the top 150 of cylinder 145 and extends axially a sufficient depth to contain capsules 146, 147, and 148 with the top of the uppermost capsule being positioned below the bottom periphery of hole 149. The lower end of central cylinder 145 is threaded at 152 and is adapted to engage the internally threaded portion of annular shoulder 126 to fixedly attach lower cylinder 112 to central cylinder 145.

Capsules 146, 147, and 148 are identical and large enough to comfortably fit into well 151 and are preferably made of a water-soluble material such as gelatin. One of these capsules contains the array shown in FIG. 8, another contains the arrangement illustrated in FIG. 9, and the third contains a carefully measured amount of sodium fluoride. The relative positions of the three capsules in the dosimeter is not critical. A straight line 153 is etched longitudinally from the bottom to the top of central cylinder 145.

Referring now to FIG. 8, the top and bottom portions of the capsule are designated, for convenience, 154 and 155 respectively. This capsule contains, as activation foils, a small thin sheet of copper foil 156 which is rolled into a tube and a small thin sheet of indium foil 157, wrapped concentrically around the copper foil. Indium foil 157 is completely shielded by a sheet of cadmium 158 which is folled into a tube and placed around rolled indium foil 157 and two small cadmium disks 159, 159' placed axially above and below rolled indium foil 157.

Referring to FIG. 9, the top and bottom portions of the capsules are indicated at 160 and 161, respectively. Contained in this capsule is a smaller capsule 162 containing a carefully measured amount of powdered sulfur. A thin sheet of indium foil 163 is wrapped concentrically around capsule 162.

In assembling the dosimeter illustrated in FIGS. 5–9, capsules 146, 147, and 148 are prepared as described above and inserted, in any order, into central cylinder 145 through opening 151. Central cylinder 145 is then inserted into opening 141 of top cylinder body 113 and holes 142 and 149 and lines 123 and 153 are aligned. Pin 144 is then inserted through holes 142 and 149 until its ends are flush with the outside surfaces of body 113, thereby firmly attaching central cylinder 145 to upper cylinder body 113. When pin 144 is in position in holes 142 and 149, with lines 123 and 153 in alignment, the upper and central cylinders 111 and 145 are properly oriented with respect to the position in which the dosimeter is to be worn. Capillary dosimeters 119, 120, and 122 are placed into wells 117, 118, and 121 respectively and cap 114 is screwed tightly onto upper cylinder body 113. Capillary dosimeters 131 and 133 are placed into wells 130 and 132 respectively of insert 128, which has been inserted into and properly aligned in lower cylinder 112, and lower cylinder 112 is screwed onto central cylinder 145, making sure that line 135 is in alignment with line 153. The dosimeter is now ready for use.

The dosimeter is worn in the pocket of the person being monitored when the person is working with or in the vicinity of radioactive material. The dosimeter of FIGS. 1–4 and the personnel monitoring section of the dosimeter shown in FIGS. 5–9 is periodically read to provide routine personnel dosimetry. The accidental criticality section of the dosimeter shown in FIGS. 5–9 is read only in the event that a criticality occurs. In this case, information recorded on the personnel dosimeter section is useful in determining the effective energy of beta, gamma, and X-radiation; the beta, gamma, and X-radiation dosage at the surface of the body and at a selected depth in the body; a rapid estimation of neutron dosage to the body; and the orientation of the body of the person wearing the dosimeter to the source of radiation.

In order to evaluate the amount and quality of radiation to which the person wearing the dosimeter is routinely subjected, the various capillary dosimeters are periodically read. The effective energy of the combined beta, gamma, and X-radiation is determined by comparing the readings of the front $^7$LiF and $CaF_2$:Mn dosimeters, designated by reference numerals 19 and 20 respectively. Since these phosphors have definite and different responses for each radiation energy level, as indicated in the graph on page 15 of THERMOLUMINSCENT DOSIMETRY (see above), a comparison of the readings obtained from these dosimeters provides the approximate energy level of the radiation if it lies between about 10 and 300 KeV or indicates if the effective energy is above 300 KeV. If the wearer of the dosimeter is facing the source of radiation during a criticality, the reading on the front $^7$LiF dosimeter 19 provides the beta, gamma, and X-radiation dosage at the surface of the wearer's body and, since upper cylinder 13 is made of tissue equivalent material, the reading on the internal ⁷LiF capillary dosimeter 22 provides the beta, gamma, and X-radiation dosage at a distance within the body equivalent to the distance from capillary dosimeter 22 to the surface of upper cylinder body 13. Since this dosimeter is centrally located, the transverse distance between this dosimeter and the outside wall of cylinder body is the same in all lateral directions. Thus, the dosage received by internal ⁷LiF dosimeter 22 is approximately equivalent to the dosage received at the same depth in the body of the dosimeter wearer when the path between the source of radiation and the dosimeter is not blocked by the body. In other words, the beta, gamma, and X-radiation dosage can be determined from the reading of internal ⁷LiF dosimeter 22 when the radiation source is to the front or to the side of the dosimeter wearer. If the person wearing the dosimeter of the invention is exposed to radiation due to an accidental criticality, the direction from which the radiation source emanated relative to the wearer's body can be determined from the readings on front and internal capillary dosimeters 19 and 22. By mounting the dosimeter on the front of a body simulation phantom and subjecting the phantom to radiation exposures at a fixed distance but from various angles in the horizontal plane, a table of the ratio of front ⁷LiF dosimeter 19 reading to internal ⁷LiF dosimeter 22 reading for each of the main compass points can be prepared. When a criticality actually occurs, the ratio of the readings on these two dosimeters can be quickly calculated and the orientation of the body to the radiation source easily determined from the table with good accuracy.

The dosage of beta, gamma, and X-radiation received by the bones of the wearer in an ionizing radiation field is determined from reading of $CaF_2:Mn$ dosimeter 20. Since this material resembles the atomic structure of bone material, the absorption of radiation by this phosphor will be approximately the same.

The presence of slow neutrons, i.e., those having energies of less than 0.5 eV, in a stream of radiation incident on the front of the dosimeters can be determined by a comparison of front and internal ⁶LiF capillary dosimeters, 31 and 33 respectively. As is well known, ⁶LiF, unlike ⁷LiF, is sensitive to neutrons. Since insert 28 is made such that wells 30 and 32 are separated by a finite distance, a comparison of the readings of dosimeters 31 and 33 indicates the concentration of incident slow neutrons in the stream of radiation. If there is a difference in the readings, i.e., if the front dosimeter gives a higher reading than the internal dosimeter, and the radiation comes from the front or at any angle up to about 90° from the vertical plane perpendicular to the front of the dosimeter, the difference will indicate the amount of incident slow neutron radiation in the radiation stream. If slow neutron radiation is of such a magnitude as to be of significant concern, this phenomenon can be enhanced by isolating the front dosimeter from the internal dosimeter by use of a slow neutron absorbing shield such as cadmium or boron.

The equivalent dosage of fast neutron in a stream of radiation approaching the body from any direction can be determined by a comparison of internal capillary dosimeters 22 and 33. Since ⁶LiF is sensitive to neutron radiation, internal capillary dosimeter 33 will register energetic beta, gamma, X-, and neutron radiation. ⁷LiF is insensitive to neutrons, however, and since the tetrafluoroethylene substantially eliminates any weak beta radiation, capillary dosimeter 22 will register a response only to energetic beta, gamma, and X-radiation. Tetrafluoroethylene and high density polyethylene have similar attenuating effects on beta, gamma, and X-radiation and, therefore, the difference between the readings on dosimeters 33 and 22 is due substantially solely to neutron radiation. A comparison of the readings of these two dosimeters, therefore, indicates the equivalent dosage of neutron striking the body in any direction.

The operation of the accidental criticality section of the dosimeter illustrated in FIGS. 5–9 is described in the prior art (see the SAVANNAH RIVER PLANT CRITICALITY DOSIMETRY SYSTEM report, above). This section of the dosimeter provides neutron spectrum dosage information. Briefly, the low energy (0.5 eV or less) neutron fluence is determined by comparing the activation of the unshielded and cadmium shielded foil. The cadmium foil screens out all neutrons having an energy of 0.5 eV or less. The neutron fluence in the range of 0.5 to 2.0 eV is determined by measuring the response of the shielded indium foil due to the $^{113}$In(neutron, gamma)$^{114}$In reaction. The neutron fluence in the range 2.0 eV to 1.0 MeV is determined from the response of the copper foil. The neutron fluence in the range 1 MeV to 2.5 MeV is determined from the response of the cadmium shielded indium foil due to the $^{115}$In(neutron) $^{115m}$In reaction. The fluence of neutrons having energies over 2.5 MeV is determined from the response of the sulfur. The orientation of the dosimeter wearer's body to the radiation source can be determined by comparing the activation of the sodium fluoride in the criticality dosimeter with that of the blood of the wearer. This determination is made to verify the rapid estimation of the body orientation indicated by the personnel dosimeter.

A particular advantage of the accidental criticality section of the dosimeter of the invention over similar prior art devices is that the capsules in the instant dosimeter are made of a water-soluble substance. Thus, it is not necessary for the person making the analysis to handle the capsules. They can be simply dropped in water and the capsules will dissolve. In the case of the sodium fluoride capsule, the analytical solution can be prepared directly from the capsule by dropping the capsule in a carefully measured amount of water and continuing the analysis. The sulfur-containing capsule can be dropped in a small amount of water and after the indium foil is removed by a tweezers (preferably before the inner capsule dissolves), the sulfur is made into a paste and is prepared for evaluation in this form. This obviates the necessity of analyzing radioactive sulfur in finely powdered form. Alternatively, the contents of the sulfur can be removed without dissolving the capsules and the sulfur analyzed dry. The elements of the cadmium shielded indium and copper foil containing capsule can either be removed by opening the capsule or by dissolving the capsule in water and removing the elements from the water by means of a tweezers.

As can readily be appreciated, the dosimeter construction is not limited to the structures illustrated and described. It is not necessary to use two separate cylinders to house the personnel section of the dosimeter, nor is it necessary to use the means illustrated and described for fastening the various elements together. Similarly, it is not necessary that the dosimeter be cylindrical in shape or that high density polyethylene be used to moderate the neutrons flowing to the internal $^6$LiF capillary dosimeter. Also, the locations of the various capillary dosimeters in the dosimeters can be changed if desired. It is intended that the claimed invention include all devices in which one or more of the novel principles illustrated and described is incorporated.

I claim:

1. A personnel radiation detecting and measuring device comprising
   A. A first section constructed of neutron moderating tissue equivalent material and containing first and second $^6$LiF dosimeters, said first $^6$LiF dosimeter being positioned sufficiently close to one surface of said first section that it is exposed to substantially all of the beta, gamma, neutron, and X-radiation incident on said surface and said second $^6$LiF dosimeter being so positioned that a measurable portion of the beta, gamma, and X-radiation is attenuated by said neutron tissue equivalent material, and a measurable portion of the incident neutron radiation, and the neutron radiation reflected from the person of a wearer, is moderated by said neutron moderating tissue equivalent material before said radiations reach said second $^6$LiF dosimeter and
   B. A second section constructed of neutron transparent tissue equivalent material and containing first and second $^7$LiF dosimeters and a CaF$_2$:Mn dosimeter, said first $^7$LiF dosimeter and the CaF$_2$:Mn dosimeter being so positioned that they are exposed to substantially all of the beta, gamma, and X-radiation incident on one surface of said second section, and said second $^7$LiF dosimeter being so positioned that the thickness of tissue equivalent material between said surface and said second $^7$LiF dosimeter is approximately equal to the thickness of tissue equivalent material between the said surface of said first section and said second $^6$LiF dosimeter, the said surfaces of said first and second sections being in alignment.

2. The device of claim 1 wherein said first section is constructed of high density polyethylene.

3. The device of claim 1 wherein said second section is constructed of poly(tetrafluoroethylene) or poly(vinylchloride).

4. The device of claim 1 wherein said first and second sections are cylindrical and are removably joined.

5. The device of claim 1 having attached thereto a pocket clip so positioned that when the device is clipped to the pocket of a person's clothing the said surfaces of said first and second sections face away from the person of the wearer.

6. The device of claim 1 wherein all of said dosimeters are contained in capillary tubes which are placed in longitudinally extending wells in said sections.

7. The device of claim 1 wherein a slow neutron absorbing shield is placed between said first and second $^6$LiF dosimeters.

8. The device of claim 7 wherein said neutron absorbing shield is made of cadmium or boron.

9. A personnel radiation detection and measuring device comprised of first and second cylindrical sections removably joined in end to end relationship, each cylindrical section having a reference index on its curved surface; said first cylindrical section being made of poly(tetrafluoroethylene) and containing two $^7$LiF dosimeters and a CaF$_2$:Mn dosimeter, one of said $^7$LiF dosimeters and said CaF$_2$:Mn dosimeter being positioned not more than one-eighth inch apart and not more than one-eighth inch from the reference index on said first cylindrical section and the second $^7$LiF dosimeter being positioned such that at least one-fourth inch of poly(tetrafluoroethylene) separates said second $^7$LiF dosimeter from said reference index; the second cylindrical section being made of high density polyethylene and containing two $^6$LiF dosimeters, one of said $^6$LiF dosimeters being positioned not more than one-eighth inch from the reference index on said second cylindrical section and the second $^6$LiF dosimeter being positioned such that the thickness of polyethylene separating the $^6$LiF dosimeter and the reference index on the second cylindrical section is approximately equal to the thickness of poly(tetrafluoroethylene) separating said second $^7$LiF dosimeter and the reference index on said first cylindrical section, said first and second cylindrical sections being oriented such that both reference indexes lie in the same radial plane.

10. The device of claim 9 wherein said second $^6$LiF dosimeter is enveloped in cadmium shielding.

11. A personnel and accidental criticality radiation detection and measuring device comprising
   A. A first section constructed of neutron moderating tissue equivalent material and containing first and second $^6$LiF dosimeters, said first $^6$LiF dosimeter being positioned sufficiently close to one surface of said first section that it is exposed to substantially all of the beta, gamma, neutron, and X-radiation incident on said surface and said second $^6$LiF dosimeter being so positioned that a measurable portion of the beta, gamma, and X-radiation is attenuated by said neutron tissue equivalent material, and a measurable portion of the incident neutron radiation, and the neutron radiation reflected from the person of a wearer, is moderated by said neutron moderating tissue equivalent material before said radiations reach said second $^6$LiF dosimeter;
   B. A second section constructed of neutron transparent tissue equivalent material and containing first and second $^7$LiF dosimeters and a CaF$_2$:Mn dosimeter, said first $^7$LiF dosimeter and the CaF$_2$:Mn dosimeter being so positioned that they are exposed to substantially all of the beta, gamma, and X-radiation incident on one surface of said second section, and said second $^7$LiF dosimeter being so positioned that the thickness of tissue equivalent material between said surface and said second $^7$LiF dosimeter is approximately equal to the thickness of tissue equivalent material between the said surface of said first section and said second $^6$LiF dosimeter; and
   C. A third section constructed of neutron transparent, tissue equivalent material and containing
      1. First and second pieces of indium, said first piece being substantially completely encapsulated in cadmium shielding,
      2. A piece of copper,
      3. A measured amount of sodium fluoride, and
      4. A measured amount of sulfur;
   said surfaces of said first and second sections being in alignment.

12. The device of claim 11 wherein said sections are removably joined.

13. The device of claim 11 wherein said first section is constructed from high density polyethylene.

14. The device of claim 11 wherein said second and third sections are constructed from poly(tetrafluoroethylene) or poly(vinyl chloride).

15. The device of claim 11 having attached thereto a pocket clip so positioned that when the device is clipped to the pocket of a person's clothing the said surfaces of said first and second sections face away from the person of the wearer.

16. The device of claim 11 wherein said indium and copper pieces are in the form of strips of foil.

17. The device of claim 16 wherein said first piece of indium foil is wrapped around said copper foil.

18. The device of claim 17 wherein said third capsule is comprised of a smaller capsule in which is contained said sulfur and around which is wrapped said second piece of indium foil.

19. A personnel and accidental criticality radiation detection and measuring device comprised of first, second, and third cylindrical sections removably joined in end to end relationship, said first and second cylindrical sections having reference indexes on their curved surfaces, said first cylindrical section being made of poly(tetrafluoroethylene) and containing two $^7$LiF dosimeters and a CaF$_2$:Mn dosimeter, one of said $^7$LiF dosimeters and said CaF$_2$:Mn dosimeter being positioned not more than one-eighth inch apart and not more than one-eighth inch from the reference index on said first cylindrical section and the second $^7$LiF dosimeter being positioned such that at least one-fourth inch of poly(tetrafluoroethylene) separates the second $^7$LiF dosimeter from said reference index; the second cylindrical section being made of high density polyethylene and containing two $^6$LiF dosimeters one of said $^6$LiF dosimeters being positioned not more than one-eighth inch from the reference index on said cylindrical section and the second $^6$LiF dosimeter being positioned such that the thickness of polyethylene separating the $^6$LiF dosimeter and the reference index on the second cylindrical section is approximately equal to the thickness of poly(tetrafluoroethylene) separating second $^7$LiF dosimeter and the reference index on said first cylindrical section; and said third cylindrical section being made of poly(tetrafluoroethylene) and containing three capsules, the first capsule containing a piece of indium foil and a piece of copper foil said indium foil being substantially encapsulated in cadmium shielding, said second capsule containing sodium fluoride and said third capsule containing a piece of indium foil and sulfur, said first and second cylindrical sections being oriented such that both reference indexes lie in the same radial plane.

20. The device of claim 19 having attached thereto a pocket clip so positioned that when the device is clipped to the pocket of a person's clothing the reference indexes on said first and second sections face away from the person of the wearer.

21. The device of claim 19 wherein said $^6$LiF, $^7$LiF, and CaF$_2$:Mn dosimeters are contained in capillary tubes which are placed in longitudinally extending wells in said sections.

22. The device of claim 19 wherein said capsules are water soluble.

* * * * *